(No Model.) 2 Sheets—Sheet 1.
A. HIRST.
APPARATUS FOR STEERING WHEELED VEHICLES.
No. 440,035. Patented Nov. 4, 1890.
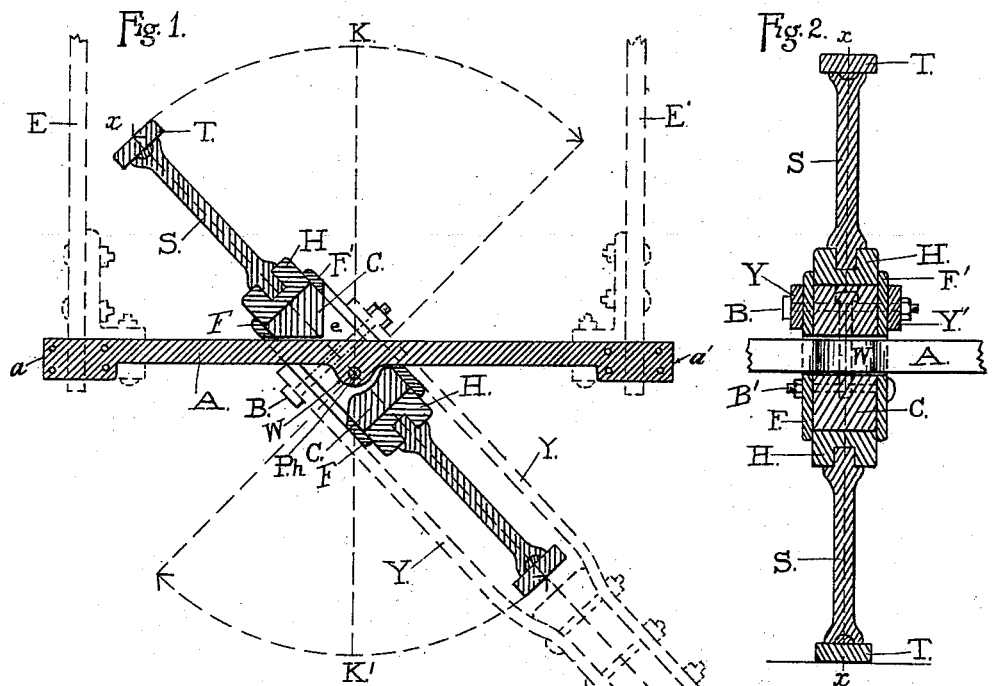
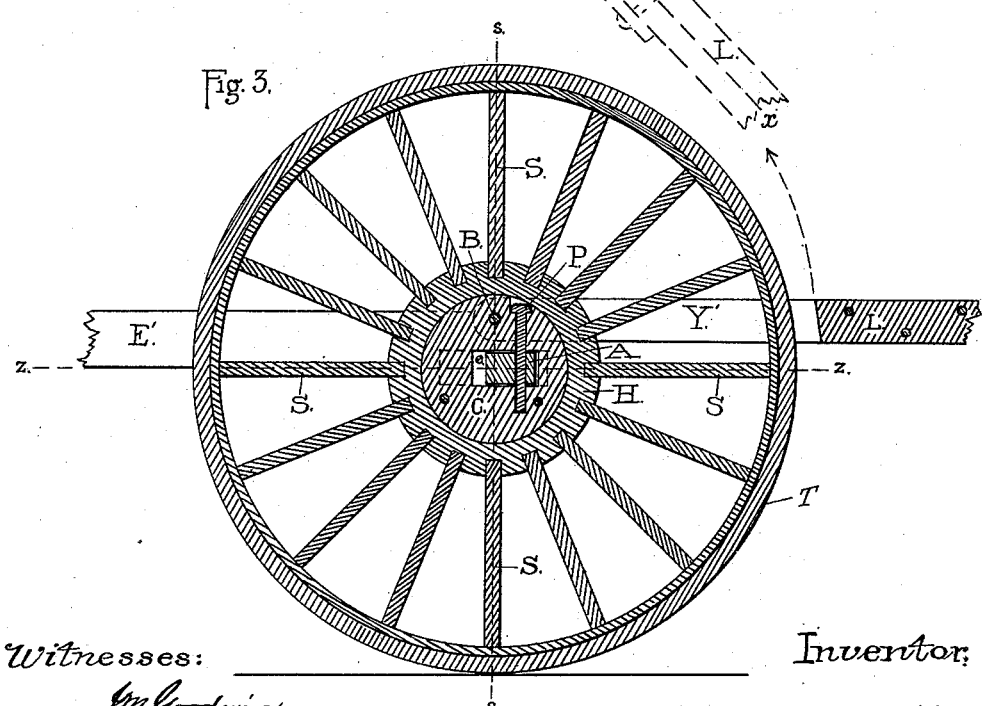
Witnesses:
J. M. Goodwin.
John McClure
Inventor:
Anson Hirst

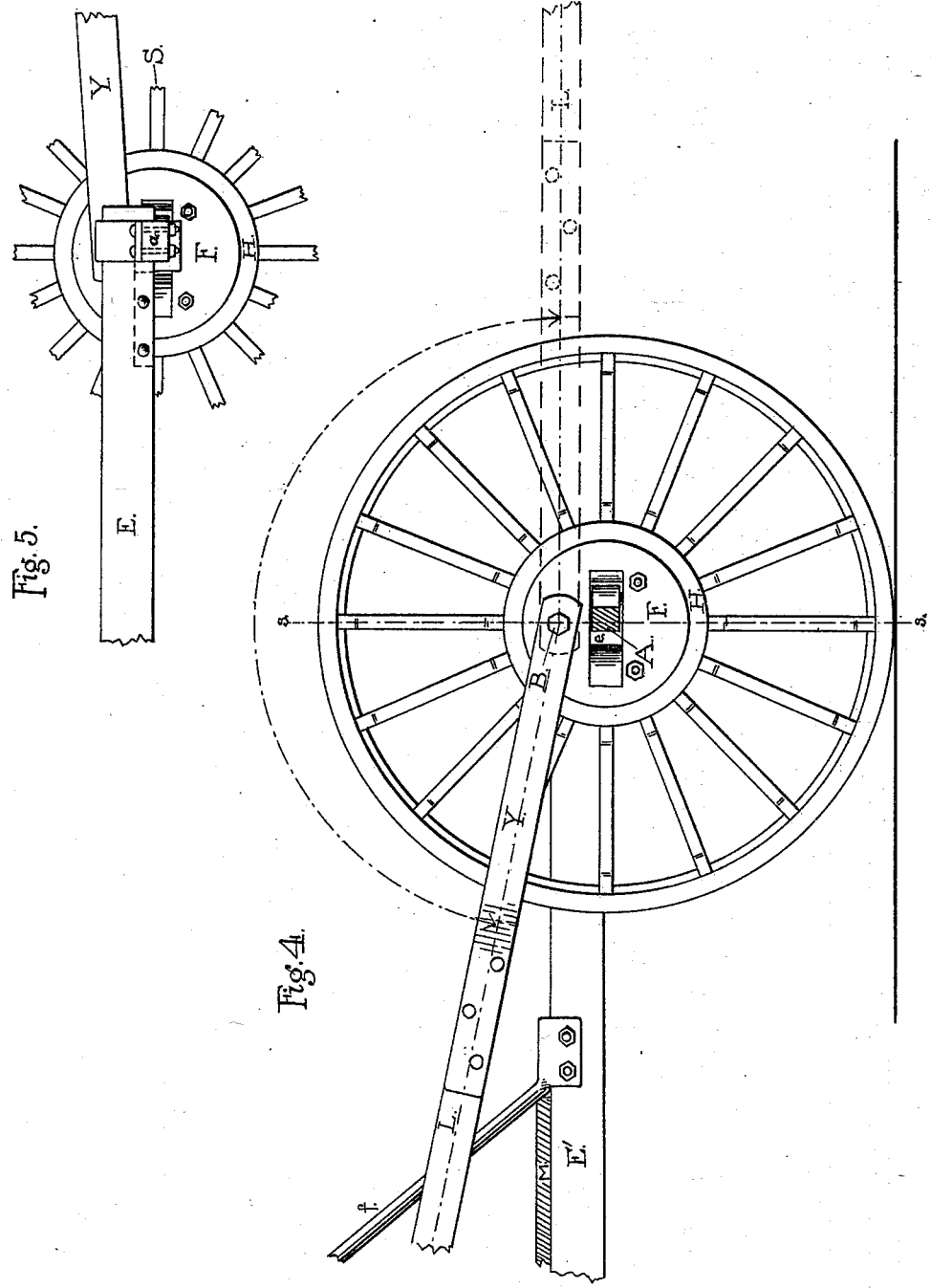

UNITED STATES PATENT OFFICE.

ANSON HIRST, OF SHARPSVILLE, PENNSYLVANIA.

APPARATUS FOR STEERING WHEELED VEHICLES.

SPECIFICATION forming part of Letters Patent No. 440,035, dated November 4, 1890.

Application filed October 4, 1888. Serial No. 287,193. (No model.)

*To all whom it may concern:*

Be it known that I, ANSON HIRST, a citizen of the United States, residing at Sharpsville, in the county of Mercer and State of Pennsylvania, have invented a new and useful Apparatus for Carrying, Guiding, and Steering Wheeled Vehicles, of which the following is a specification.

My invention relates to appliances for guiding and steering wheeled vehicles other than those described distinctively as railway or tramway vehicles.

A four-wheeled vehicle, road-wagon, or carriage drawn by animal-power has, ordinarily, two axles of equal length, each carried by two wheels—one at either end thereof—the "hind" axle being fixed across the frame of the vehicle and the forward axle pivoted midway of its length. The vehicle is guided or steered in its travel by means of a pair of shafts or a "pole" suitably attached to the forward axle, whereby said axle is held square across the body of the vehicle, or on occasion is horizontally swiveled, with the effect of directing the forward wheels therewith associated to the right or left, as need be. There are carriages—as, for instance, some "hook-and-ladder" trucks—in which the forward axle is pivoted and operated as in the above-mentioned vehicles, and the hind axle is likewise pivoted, and is governed and swiveled by means of special appliances to the end that the hinder part of the truck may be made to travel in a curve exterior to one described by the forward wheels, and to otherwise deviate from the course of the forward wheels. With a wheeled vehicle guided or steered by means of a swiveling axle having a carrying-wheel at each extremity, when one wheel meets an obstruction from which the other is free the pole or equivalent steering-lever attached to the said axle is wrenched to the side on which the obstruction is. When a heavily-loaded wagon travels on a rough road or pavement, the lateral vibrations of the pole are constant and violent. With a view to moderating vibrations of this sort, as well as to effect some other desirable results, the forward axle of some heavy four-wheeled cabs and like vehicles is made much shorter than the hinder one, and in four-wheeled baggage-crates and warehouse-trucks this mode of construction, the utility of which in the direction specified is sufficiently obvious, is quite generally followed; and the shortening of a forward axle has been carried to its ultimate result in the construction of certain light road-vehicles, as well as in some warehouse-trucks and similar carriages heretofore in use, in which the hinder end of the vehicle is carried by a fixed axle, as in ordinary four-wheeled vehicles, while the forward end of the vehicle is carried by one wheel, commonly situate midway of the width of the vehicle and mounted in a yoke or bifurcated pedestal. It is in some cases, however, mounted on a horizontal journal-pin having one free end. This wheel is not necessarily set midway of the width of the carriage. It may stand on the line of one side of the carriage. Such wheel is held in a vertical plane ordinarily by means of a perpendicular (but sometimes inclined) spindle working in a long bearing fixed in the frame of the vehicle, and when so mounted the wheel is commonly placed beneath the frame of the vehicle, and its diameter proportionate to that of the associated hind wheels is materially less than that of a "fore" wheel to a hind wheel in an ordinary four-wheeled wagon. By use of a "goose-neck" projecting forward beyond and above the vehicle-frame and carrying the bearings of such spindle an increase of diameter of such wheel is rendered practicable. For a road-wagon a wheel thus mounted if placed beneath the platform of the vehicle is unduly small. The introduction of the goose-neck device entails increase (ordinarily seriously objectionable) of total length of vehicle, and in any case the vertical spindle, necessarily long, and its unavoidable accompaniments very objectionably occupy space and dominate construction. Such wheel mounted on a spindle is commonly swiveled by means of a pole or "tongue" suitably bifurcated to embrace or yoke the wheel, each arm of the yoke so formed being connected with the corresponding side of the pedestal-yoke or taking hold on the corresponding end of the axle of the wheel. In some vehicles the single wheel in question has been made with an elongated hub, like that of the ordinary wheelbarrow-wheel, which hub by suitable axle-pins has been journaled beneath a flat ring operating in association with an opposed superior ring as the "fifth-wheel," so called, of ordinary four-wheeled vehicles, and in some road-vehicles the single wheel thus mounted has been swiveled and the vehicle guided or steered by means of a pair of shafts (and possibly in some instances by means of a pole) attached and used as and for the purposes for which such appliances are attached and used in ordinary four-wheeled vehicles, and I have in actual practice used in a self-propelling road-vehicle a single wheel of my own devising, having a distinctively "long" hub or axle, like that of a wheelbarrow-wheel, operating in the manner above described in association with a fifth-wheel or traversing-circle; but for swiveling this wheel, and thereby guiding or steering the vehicle, I employed a bifurcated lever taking hold of the ends, respectively, of the axle of the wheel or of the corresponding sides of the ring to which the wheel was attached and extending back into the vehicle. I found the traversing-circle device effective in the direction of holding the wheel in a vertical plane; but the friction of the rings aforesaid was so great as to make the manipulation of the steering-lever excessively laborious and a proper operation of it sometimes entirely impracticable.

While, as before stated, the forward end of a light road-vehicle has been heretofore carried by a single wheel, serving also as a steering-wheel, I do not know that any apparatus has heretofore been devised whereby a ponderous vehicle, like a road-engine, may be effectively steered by a single wheel, used also to carry one end of such vehicle.

In self-propelling vehicles, as "road-engines" or "traction-engines," traveling on common roads, the forward end of the vehicle has been heretofore carried by two wheels working on a pivoted cross-axle, as in an ordinary road-wagon. In guiding and steering the vehicle said axle is held and on occasion swiveled by means of a chain, which, being wound on a shaft lying square across the frame of the vehicle in the rear of the pivot of the axle, has each of its ends connected with the corresponding arm of the axle. This shaft being made to revolve, one part of the chain is wound onto the shaft, drawing the corresponding arm of the axle toward the shaft, while by reciprocation the other part of the chain is paid off the shaft, proportionately releasing the arm of the axle thereto attached. Attempts have been made to use bevel-gear for operating this winding-shaft; but with a heavy vehicle of the kind in question the shocks and wrenchings arising from causes hereinbefore indicated, to which a wheel mounted and operating in the manner just described is subject, have been found practically uncontrollable by such gear, and screw-gear is now used; or, if the bevel-gear be retained, the shocks upon it are relieved by use of a leading-pole, guided by animals harnessed thereto.

Reaping-machines and "harvesters" are commonly mounted on two wheels and guided by a pole, to which the animals drawing the machine are yoked, and the draft-animals have to carry the always-considerable and sometimes great weight thrown upon the pole. By use of a single wheel, which, while carrying the weight of the machine now thrown upon the pole, will serve to guide and steer the machine, the work of the team hauling such machine will be largely lightened.

The object of my said invention is to provide for carrying, directing, guiding and steering wheeled vehicles other than tramway or railway vehicles, and particularly wheeled vehicles ponderous in themselves or carrying distinctively heavy loads—such as road-making machines and agricultural machines and wagons drawn by animal-power or self-propelling, and self-propelled road-engines and traction-engines—appliances by use of which one end of such vehicle will be carried by a single steering-wheel, in the operation of which neither the traversing-circle nor the vertical bearing-spindle-gear, the disadvantageous qualities of which are above specified, is employed. I attain my said object by the devices illustrated by the accompanying drawings, in which—

Figure 1 shows a transverse section of my steering-wheel and a horizontal section of the "axle-block" or journal, on which it revolves, on the line $z\ z$ of Fig. 3, and a longitudinal section of the axle-bar A, on which the axle-block is pivoted. Fig. 2 is a transverse section of the wheel and axle-block on the line $s\ s$ of Fig. 3, with the axle-bar A shown as in place in the axle-block. Fig. 3 is a longitudinal section of my said wheel and its axle-block, and of the steering-pole L on the line $xx$ of Fig. 1 and a vertical section of the axle-bar and king-bolt P on the line $x\ x$ of Fig. 2. Fig. 4 is a side elevation of the wheel and a portion of the frame of the vehicle of which it is a part with the axle-bar in cross-section and with the steering-pole reversed or thrown back into the vehicle in position reverse to that in which it is shown in Figs. 1 and 3. Fig. 5 shows one mode of attaching the frame of the vehicle to the axle-bar.

In the figures, throughout which similar letters indicate similar parts, E and E' represent the side members of the frame of a road-engine or locomotive traction-engine. In the drawings these frame members rest upon and are rigidly connected with the axle-bar A of the steering-gear; but, if desired—as, for instance, to accommodate an increased diameter of the steering-wheel—the side-frame members may be suspended from the axle-bar. The bar A, to which the frame members E and E' are rigidly attached, as aforesaid, is at once the forward cross member of the frame of the vehicle and the axle-bar on which the steering-wheel is mounted, and in said bar, preferably midway of its length, is a vertical king-bolt hole P$h$, Fig. 1.

The steering-wheel proper combines in its construction the hub H, preferably of cast metal, and the spokes S S, &c., and the rim T, preferably of wrought metal. The hub, suitably bored and fitted for the purpose, revolves upon the axle-block C, which is preferably a cylindrical, but it may be a conically tapering, block of metal in length (or thickness) corresponding with the length of the hub centrally perforated and suitably chambered, as hereinafter more particularly set forth, for reception and accommodation of the axle-bar. The hub is held in place on the axle-block by two circular plates F and F' of diameter something greater than that of the axle-block, each having in it a perforation corresponding with that in the axle-block, one of which plates lies on either end of and concentric with the axle-block, and by bolts, as B', Fig. 2, passing through the plates and the block, these plates are fixed to the axle-block, together forming a channel in which the hub H revolves upon the said block, as illustrated in Figs. 1 and 2. The aforesaid perforations in the axle-block C and in the associated plates F and F', respectively, together form a slot-like chamber e, Figs. 1 and 3, axial and diametrical to the said block and the side plates thereof, throughout which it extends, which chamber, when the block is in position for service, lies horizontally. Midway of the thickness of the axle-block this chamber has a width equivalent to about three (3) measures of the lateral thickness of the axle-bar. From the vertical plane just indicated, midway of the thickness of the axle-block, the opposing sides of the chamber respectively diverge at an angle of about forty-five degrees therewith. The point midway of the "forward" wall of the said chamber is in Fig. 1 cut away to accommodate a boss W, by which the axle-bar is re-enforced at the point of passage through it of the king-bolt hole P$h$.

In the operation of assembling and mounting the steering-wheel the axle-bar is inserted in the aforesaid chamber in the axle-block, and the block is pivoted in the axle-bar by the pin or king-bolt P, Fig. 3, inserted in a suitable hole extending from the periphery of the block, and at right angles with that diameter of the block on which the aforesaid chamber lies into said chamber and correspondingly from said chamber into that part of the block below the same, which pin passes through the hole P$h$ in the axle-bar. The hub of the wheel is then slipped upon the axle-block, and the aforesaid plates or channel-pieces F and F' bolted in place.

For manipulating the wheel, the steering-pole L, Figs. 1, 3, and 4, is provided. This pole has arms Y Y', (see all figures,) which yoke the wheel. The arms are pivoted on the axle-block C by the bolt B, which serves also to clamp the channel-plates F and F'. The pole may be applied to its special use when in position as a leading-pole, as indicated in Figs. 1 and 3, or when reversed upon its pivot B, and in position as a steering-pole, as shown in Fig. 4.

In actual service this steering-wheel in a road-engine being set on the line K K' of Fig. 1, the "adhesion" of the axle-bar and the floor of the chamber e ordinarily suffices to hold the wheel in the position named. Suppose the vehicle indicated in Fig. 1 to be traveling from K toward K', then to make a turn to the left the wheel is by means of its pole swiveled into the position in which it is shown in Fig. 1. Obviously, a turn to the right would be made by swiveling the wheel in the direction indicated by the arrow-headed broken lines in Fig. 1. Considered simply with regard to its effect upon the operation of steering, the placing of the pivot—"king-bolt"—on which the axle-block swivels, in advance of the axis of revolution of the wheel, as it is shown in the drawings, is not material; but with this pivot situate as shown the rear exterior corner of the floor of the axle-block chamber e when the wheel in the act of turning the vehicle stands as shown in Fig. 1 supports the axle-bar more effectually than it would were the pivot in the vertical diameter of the axle-block.

Having fully described my invention, what I claim, and desire to secure by Letters Patent, is—

1. The improved vehicle carrying and steering apparatus herein described, comprising the fixed axle-bar, the axle-block chambered to receive the axle-bar and to admit lateral swiveling of the block thereon, and pivoted in said bar, the steering-wheel composed of the annular hub embracing and revolving on the axle-block, and provided with suitable spokes and rim, the channel-plates retaining the hub in its place upon the axle-block, and the reversible guiding and steering pole pivoted in the axle-block for swiveling the same and the associated wheel, and thereby directing and steering a vehicle, substantially as set forth.

2. In an apparatus for steering wheeled vehicles, the combination of an integral member of the frame of a vehicle utilized as an axle-tree, with an axially-perforated and diagonally-chambered axle-block, embracing such member and pivoted in and laterally swiveling on the same, and serving as a swiveling-journal for a carrying and steering wheel thereon mounted, substantially as set forth.

3. In an apparatus for steering wheeled vehicles, the combination of a cylindrical or conically-tapering axle-block or wheel-journal perforated in the direction of its axis and diagonally chambered, embracing, pivoted in, and laterally vibrating on a fixed bar serving as an axle-tree, with a wheel revolving on such axle block or journal and carrying and steering a vehicle, substantially as set forth.

4. In an apparatus for steering wheeled vehicles having a single steering-wheel serving also as a carrying-wheel, the reversible leading and steering pole L, constructed, attached, and operating substantially as and for the purposes set forth.

5. In an apparatus for carrying and steering locomotive-road engines and traction-engines, and road-making machines and agricultural machines, mounted on wheels, self-propelled or drawn by animal-power or moved by steam-power and animal-power associated, the single carrying and steering wheel journaled on a laterally-swiveling axle-block pivoted in a fixed axle-tree, constructed, mounted, and operating substantially as and for the purposes set forth.

ANSON HIRST.

Witnesses:
J. M. GOODWIN,
JOHN MCCLURE.